Aug. 7, 1956   E. S. WATSON ET AL   2,757,541
SAMPLING APPARATUS
Filed Feb. 27, 1956   2 Sheets-Sheet 1
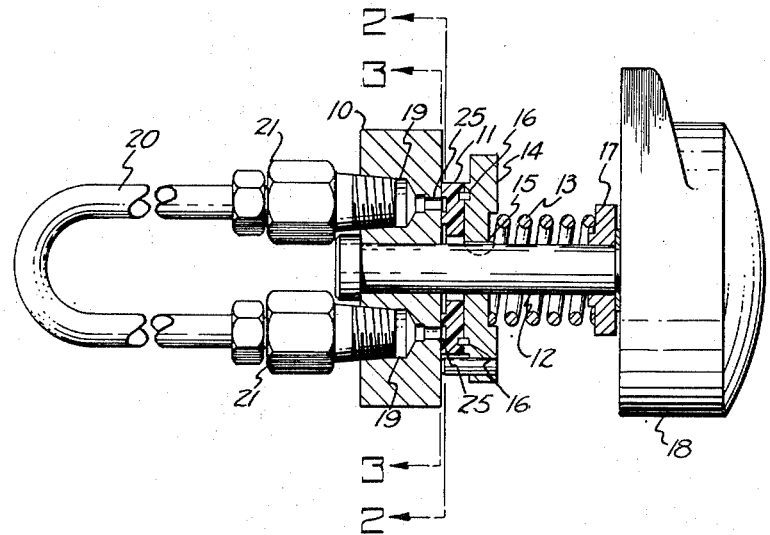
Fig.1.
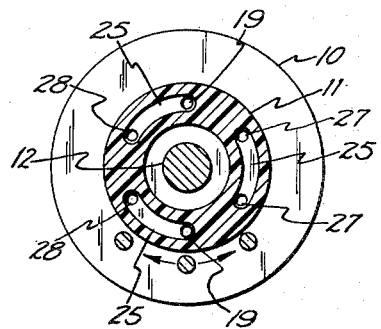 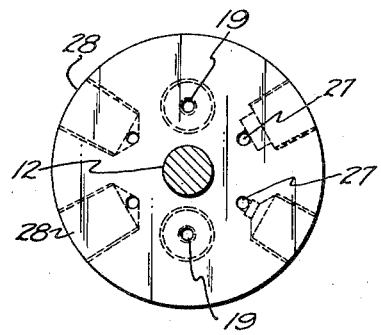
Fig.2.   Fig.3.
INVENTOR.
EMMETT S. WATSON
DONALD R. BRESKY
BY
ATTORNEY Aug. 7, 1956   E. S. WATSON ET AL   2,757,541
SAMPLING APPARATUS Filed Feb. 27, 1956   2 Sheets-Sheet 2

INVENTOR.
EMMETT S. WATSON
DONALD R. BRESKY
BY
ATTORNEY.

United States Patent Office 2,757,541
Patented Aug. 7, 1956

2,757,541

SAMPLING APPARATUS

Emmett S. Watson, Ridgefield, and Donald R. Bresky, Bridgeport, Conn., assignors to The Perkin-Elmer Corporation, Norwalk, Conn., a corporation of New York Application February 27, 1956, Serial No. 568,028

9 Claims. (Cl. 73—422)

This invention relates to a sampling apparatus and more particularly is directed to a device which is an especially useful accessory to analysis systems where it is desired to draw a precisely reproducible volume of sample from one of several fluid streams and introduce that sample into another fluid stream.

Instruments which analyze fluids by means of vapor fractometry (also known as vapor phase chromatography) phenomena, for instance, usually require that the fluid sample undergoing investigation be introduced into a fluid stream which performs the function of a carrier, conveying the sample into and through the instrument. In the practice of that particular technique of chromatographic separation or vapor fractometry known as the partition or elution method of segregating the constituents of a sample, the analysis is achieved by detecting the sequence in which the components of the sample mixture emerge from the partition column, and the amount of each component. The carrier fluid used in this method is usually a gas such as nitrogen. Not infrequently, such vapor fractometry instruments are designed to accept different types of fluids so that the vapor fractometry technique is useful in the analysis of gas mixtures as well as in the analysis of liquid mixtures.

One sampling technique which has been found feasible in the analysis of liquids by vapor fractometry involves the use of a syringe with a needle means by which a measured volume of liquid sample may be drawn from a selected fluid stream or other sample source. The liquid sample is then introduced into the moving stream of carrier fluid by injection through the hollow needle positioned in the carrier fluid.

It has been found, however, that the use of the syringe technique is not wholly satisfactory for introducing gas mixture samples into the flowing carrier stream of a vapor fractometry instrument, and there are additional problems involved in handling a gas sample which must be solved if the analysis apparatus is to achieve its maximum accuracy and reliability. Generally speaking, gas samples are necessarily greater in volume than liquid samples and gas samples therefore require an oversized syringe device which may be somewhat awkward and inconvenient to handle. Moreover, any syringe device always presents a problem of leakage of the fluid sample around and about the plunger, for instance, and this problem is heightened by the fact that gas samples require a gas-tight seal rather than a liquid-tight seal between the contact surfaces of the syringe. Thus, a syringe which is satisfactory for use with liquid samples may be unsuited to use with gas samples.

Additionally, it can readily be appreciated that the pressure of a liquid will generally remain substantially stable so that the volume and temperature of the same liquid sample will not ordinarily vary significantly in the course of its being drawn from one fluid stream and introduced into the flowing stream of carrier gas in an analysis instrument; the same may not, however, be true of a gas sample. The pressure of a gas sample is subject to wide variations in response to a change of one or both of the inextricably related parameters of temperature and volume. Consequently, while it is possible to draw a known or determinable volume of gas sample into a syringe at a known or ascertainable temperature, the pressure of such sample is comparatively difficult to determine. Even when such gas pressure within the syringe is accurately determined, it may be considerably different from the fluid stream or other sample source whence it was drawn. Such a discrepancy is not usually desirable.

Another consideration that may give cause for concern arises from the fact that, in forcing a gas mixture sample from a syringe into a fluid carrier stream, the sample volume will likely be reduced due to the increased pressure which the plunger exerts upon the sample. Under such conditions, it is highly likely that a temperature change will also take place. It has been observed, for instance, that in using the syringe technique to introduce gas samples into vapor fractometry analysis instruments, sufficient pressure may be developed within the syringe to liquify some components of the gas mixture. This result is, of course, not desirable. Manifestly, more highly accurate and reliable results may be obtained by introducing a sample of known temperature, volume, and pressure into the carrier gas stream without any significant change in its parameters.

The present invention thus has as its primary object the solution of undesirable aspects of prior art techniques and apparatus for introducing fluid samples into analysis instruments.

In accordance with the concept of the present invention, a fluid sample of known or determinable volume, pressure, and temperature may be drawn from one of several fluid streams and introduced into the carrier fluid stream of an analysis instrument without significantly changing its volume, temperature, or pressure, either by the operation of drawing the sample off from the sample source or by introducing it into the analysis instrument.

Apparatus operating in accordance with the teaching of the present invention provides through paths for a plurality of continuously flowing streams and readily affords the selection and extraction of a sample fluid from one stream and its introduction into another stream with only a momentary interruption of the continuously flowing streams connected therewith.

Apparatus constructed and arranged in accordance with the present invention is readily adaptable for use in conjunction with fluid analysis systems which are automatically actuated to select samples for analysis at regular cyclic intervals. Such systems may periodically select a sample from the same fluid stream or may be arranged to alternately or sequentially select fluid samples from different sources.

The present invention is so conceived that it eliminates troublesome "dead volume" in the sample space, i. e., remote or constricted spaces which are likely to trap a small quantity of sample which cannot be readily purged or evacuated.

A better understanding of the present invention may be had from the following description of the construction and operation of several embodiments, illustrated by the accompanying drawings in which:

Fig. 1 is a sectional view of a sampling device embodying the present invention;

Fig. 2 is a sectional view of the device of Fig. 1 taken through lines 2—2 of Fig. 1;

Fig. 3 is a sectional view of the device of Fig. 1 taken through lines 3—3 of Fig. 1;

Figure 4:
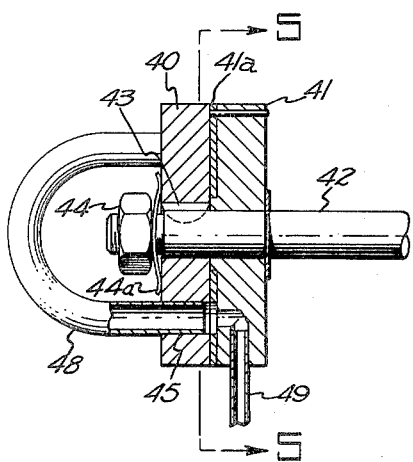
Figure 5:
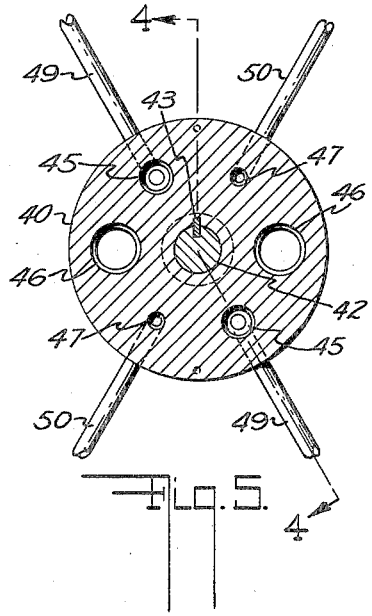
Figure 6:
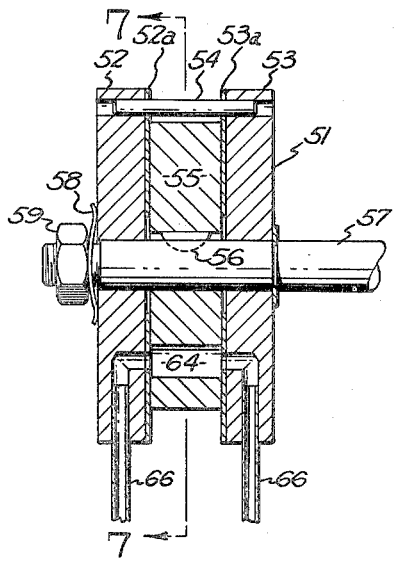
Figure 7:
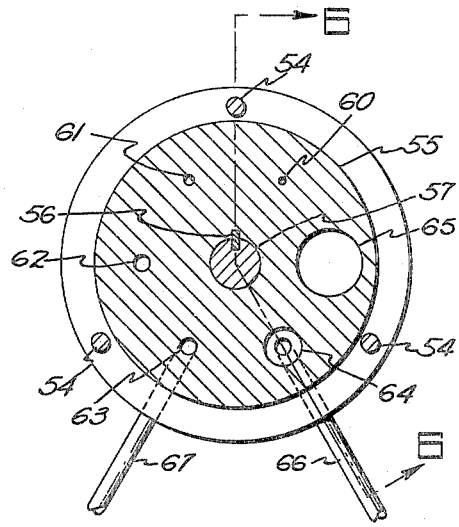

Figs. 4 and 5 are sectional views of another embodiment of the present invention, Fig. 4 being taken through lines 4—4 of Fig. 5, and Fig. 5 being taken through lines 5—5 of Fig. 4; and Figs. 6 and 7 are sectional views of another embodiment of the present invention, Fig. 6 being taken through lines 6—6 of Fig. 7, and Fig. 7 being taken through lines 7—7 of Fig. 6.

Fig. 1 illustrates an embodiment of the present invention comprising a body assembly having two sections 10 and 11 which are mounted on a common shaft 12 and are movable relative to each other about the axis of the shaft 12. The body member 11 is compressively held in sliding contact with the body member 10 by means of a spring 13 which bears upon a circular back-up plate 14 keyed to the shaft 12 as shown at 15. The plate 14 is structurally integrated with the body member 11 by means of a plurality of connecting pins 16 so that both members rotate with shaft 12. The compressive action of the spring 13 bearing upon plate 14 is uniformly distributed over the entire area of the body member 11 of the body assembly. The spring 13 bears upon a washer 17 at its opposite end and a knob 18 is affixed to the shaft 12 to facilitate rotating member 11 of the body assembly relative to member 10 of the body assembly. Member 10 of the body assembly is preferably made of stainless steel or other suitable corrosion-resistant material and has a plurality of passages therein, two of which are shown at 19 in the cross-section of Fig. 1.

The internal passages through body member 10 are connected as illustrated in Fig. 1 with a hollow tube 20 which functions as a sample chamber. By welding or other appropriate means, such as the couplings shown at 21, the sample tube 20 is arranged to be an operative part of the body assemby. The body member 11 of the assembly is preferably made of a smooth-surfaced, semi-resilient material which is chemically inert and impervious to corrosive effects, such as tetrafluorethylene resin sold commercially as Teflon. Another suitable material for member 11 is the polymer of trifluorochloroethylene. The smooth, resilient quality of member 11 facilitates making a tight seal between the faces of members 10 and 11 of the body assembly, while its resistance to corrosion makes it possible to use the device with a wide variety of chemical samples. The member 11 is provided with a number of arcuate recesses 25, as shown in the sectional view of Fig. 2, formed as passages and being disposed and positioned to connect the internal passages of member 10 of the body assembly. Thus, it may be seen that the arcuate recesses 25 extend through an angle sufficiently large to include adjacent internal passages. The rotational disposition of member 11 determines which of the adjacent internal passages of member 10 of the body assembly are connected through the arcuate recesses 25.

As shown in Fig. 3, it may be seen that if passages 27 are connected externally to a first fluid stream, internal continuity of flow of the stream is afforded by one of the arcuate passages 25 of member 11 of the body assembly. Assuming further, for purposes of explanation, that another fluid stream is externally connected to the passages 28, the two arcuate recesses 25 of member 11 of the body assembly which connect the passages 28 with the passages 19 will afford a continuous path of flow for the second fluid stream through the sample chamber 20.

As may be seen from Fig. 2, if the rotatable member 11 is turned about the shaft 12 for approximately 60° in a counterclockwise direction, the first fluid stream connected with passages 27 will be connected to the sample chamber 20 through passages 19, while the second fluid stream connected with passages 28 will be provided with continuity of flow through one of the arcuate passages 25 connecting the two passages 28. The amount of fluid from the first stream which was passing through the sample chamber at the instant of such rotation of the sampling assembly is thus introduced into the second fluid stream and becomes the sample.

It is important to note that the first fluid stream connected to passages 28 fills the sample chamber 20 with a sample fluid which necessarily and inherently has the same temperature and pressure as the stream whence it came. Of course, the sample chamber 20 may be dimensioned so that the flow of sample extracted from the stream is of any desirable volume within a wide range. The sample fluid will therefore be of a known volume as well as being at the same temperature and pressure as that of the fluid stream where it originated. These operational features are particularly important in extracting a gas sample from a gas mixture stream and afford several of the more important advantages of the present invention by means of which the uniformity of sample conditions may be readily maintained.

In using the sampling device of the present invention with a vapor fractometry analysis instrument, one of the fluid streams may be connected with passages 28 and a sample extracted therefrom so as to fill the sample chamber 20. Upon switching the device as has previously been described, a carrier gas, such as nitrogen, drawn from a second fluid stream may be connected with the sample chamber and cause the fluid sample therein to be introduced to the column wherein the chromatographic separation of the constituents of the fluid sample takes place. It will be noted that not only does the sampling device of the present invention afford a means of extracting from a fluid stream a sample of known temperature, pressure, and volume, but the continuity of flow of each of the fluid streams is maintained at all times except for the very slight momentary interruption during the instant when the actual switching of member 11 with respect to member 10 is taking place.

Another most desirable feature of the present invention is that it virtually eliminates any need for purging, such as may be necessary when the syringe sample technique is used. It will be noted that with the rotatable member 11 positioned 60° counterclockwise from the disposition shown in Fig. 2, a carrier gas, such as nitrogen, flowing through passages 27 will ordinarily purge the sample chamber of all the sample contained therein. The sample chamber is thus ready to accept another sample without the danger of the second sample being contaminated by traces of the first sample. This, of course, eliminates the possibility of errors being introduced into the analysis of successive samples.

It has been found that the rotatable member 11 of the body assembly when made of resilient material, such as the plastic sold commercially as Teflon, can be smoothly faced to make a good gas-tight seal against the surface of member 10 of the body assembly when held in compressive contact by appropriate means such as a coil spring or spring washer. It is to be noted also that the rotation of the member 11 with respect to the member 10 will cause a certain amount of wear of the two faces in sliding contact. Such wear does not, however, interfere with the operation of the assembly but will rather improve the seal made between contact surfaces of the two members 10 and 11. Such a seal need not be lubricated and the advantages of a dry seal will be evident to those familiar with the problems of vapor phase chromatography. Lubricants may possibly have a vapor characteristic within the operative range of the fractometry instrument itself, thereby giving rise to a possible source of error. There is an even greater probability that lubricant which comes in contact with the sample will absorb some part of the sample mixture and introduce qualitative and/or quantitative error into the analysis data.

Figs. 4 and 5 illustrate another embodiment of the present invention wherein the two sections 40 and 41 of the body assembly are positioned in contact with each other. Member 40 is arranged to rotate with a central shaft 42 relative to member 40 in a manner similar to that previously described in connection with the embodiment of Figs. 1, 2, and 3. The stationary member 41 is provided with a resilient face 41a cemented or appropriately affixed thereto. The rotatable member 40 is keyed at 43 to the shaft 42 and a spring washer 44a held down by a nut 44 exerts compressive pressure between the faces of the two members of the body assembly 40 and 41a which are in sliding contact. As is shown in Fig. 5, opposite pairs of passages 45, 46, and 47 are radially disposed and equally spaced about the center of member 40 of the body assembly. Each pair of passages is adapted to accommodate a different size of substantially U-shaped sample chamber, such as that shown at 48 in Fig. 4.

Pairs of conduits 49 and 50 are connected to passages within the stationary member 41 so that a continuity of stream flow may be had entering one of the fluid conduits 49, passing through the sample chamber 48 connected to passages 45, for instance, and out of the sampling assembly through the opposite conduit 49. Similarly, a continuous fluid flow may be had through conduit 50, the sample chamber connecting with passages 47, and out of the sampling assembly through the diametrically disposed fluid stream conduit 50. It may be assumed for purposes of explanation that a sample fluid stream flows through conduits 49 and sample chamber 48, and that a carrier fluid, such as the nitrogen gas used in a vapor fractometry type of analysis instrument, flows through conduits 50. It follows accordingly that, by changing the rotational disposition of member 40 through a 60° angular span clockwise, the sample contained in sample chamber 48 will be disconnected from the sample fluid stream entering the sampling assembly through conduit 49 and introduced into the carrier fluid stream of the analysis instrument flowing through conduits 50.

This particular embodiment is designed and arranged so that any one of a plurality of sample chambers may be selectively connected to a first fluid stream, and the sample which is extracted therefrom introduced into a second fluid stream. Though this embodiment employs a plurality of sample chambers rather than a single interchangeable sample chamber, the continuity of flow in both fluid streams is provided for and preserved in much the same manner as has been explained hereinbefore and demonstrated in the explanation of the embodiment of Figs. 1, 2, and 3.

Figs. 6 and 7 illustrate yet another embodiment of the present invention in which the stationary member 51 of the body assembly is comprised of two sections 52 and 53 which are made structurally unitary by a plurality of interconnecting pins 54. Each section of the stationary member is provided with a resilient face affixed thereto as shown at 52a and 53a. The rotatable member 55 of the body assembly is positioned between the two sections 52 and 53 of the stationary member 51, and opposed faces of the rotatable member 55 are in sliding contact with the two sections of member 51. The rotatable member 55 is keyed at 56 to the shaft 57, and the several contact surfaces of the body assembly are held under compression by a spring washer 58 and nut 59 on the end of the shaft 57.

A number of sample chambers 60, 61, 62, 63, 64, and 65 are contained in the rotatable member 55. The sample chambers are varied in volumetric size and, by rotating shaft 57 and member 55 within the body assembly of the sampling device, the sample chambers may be selectively disposed about the axis of the shaft rotation. A first fluid stream 66 may be connected to the fixed body member of the sampling assembly as shown in Figs. 6 and 7. A second fluid stream may be similarly connected into the two sections 52 and 53 of the fixed member 51 of the sampling assembly, and a sample from the first fluid stream 66 may be transferred by means of sample chamber 64, for instance, and introduced into the second fluid stream 67 by a 60° clockwise rotation of the movable member 55 of the sampling assembly. Such a sample will be introduced into the second fluid stream at the same temperature and pressure as that of the stream from which it was taken. The volume of the sample may be determined and selected in accordance with which of the plurality of sample chambers 61, 62, 63, 64, or 65 is employed to transfer the sample from one fluid stream to the other.

The embodiment of Figs. 6 and 7 may be provided with any desired number of sample chambers and appropriate indicator means operatively linked with the rotatable member 55 to afford positive identification of which of the several sample chambers is connected with each of the several fluid streams.

It should be noted that, in accordance with the concept of the present invention, each of the embodiments disclosed is provided with one or more sample chambers which are an integral and operative part of the sampling assembly. The embodiments shown and described may be changed so as to include the desirable features of two or more versions of the present invention according to the particular needs and requirements of any special application in which it is employed.

Each of the embodiments of the present invention may be arranged so that the sample chamber may be evacuated and a sample admitted to the device at any desired pressure. In the embodiment of Figs. 1, 2, and 3, for instance, the ports 28 may be connected to appropriate evacuating means and a sample admitted to the sample chamber 20 at any desired pressure under the control of appropriately connected sampling means. Substantially the same procedure can be carried out with each of the two other embodiments disclosed herein.

In accordance with its concept and execution, it will be noted that the sampling device of the present invention is particularly lacking in "dead volume" in all the embodiments disclosed. By "dead volume" is meant that space in a sampling device which may be relatively inaccessible for purposes of purging and evacuation. The present invention, it will be noted, has the advantage of being devoid of recesses or constrictions where sample mixture may undesirably be retained. The sample chambers in all the embodiments of the present invention may be readily purged by a carrier gas, such as nitrogen, in common use in vapor fractometry analysis instruments, the entire sample chamber being in the normal path of the flow of such carrier gas.

In the embodiment of Figs. 1, 2, and 3, one of the arcuate recesses 25 is actually part of the sample volume. This, however, is not undesirable of itself as the arcuate recesses are not "dead volume." The embodiments of Figs. 4, 5, 6, and 7 do not include such arcuate recess or its equivalent as part of the sample volume and, therefore, may be particularly desirable in certain applications, especially where only a relatively very small and limited amount of sample is available for test and analysis purposes.

Since may changes could to made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

We claim:

1. A sampling device comprising a body assembly having two sections compressively held in sliding contact, said body assembly including a sample chamber of known volumetric capacity and inlet and outlet passages connectable with at least two fluid streams, one section of said body having passages therein spaced and disposed for selectively connecting said sample chamber to any of said fluid streams, and means for slidably positioning one section of said assembly with respect to the other whereby to select a known volume of sample from one of said fluid streams and introduce said sample into another of said fluid streams.

2. A sampling device comprising a fixed member including a sample chamber of known volumetric capacity and inlet and outlet passages connectable with at least two fluid streams, a movable member having passages therein spaced and disposed for selectively connecting said sample chamber to any of said fluid streams, and means for slidably positioning said movable member with respect to said fixed member whereby to select a known volume of sample from one of said fluid streams and introduce said sample into another of said fluid streams.

3. A sampling device comprising a body assembly including a fixed section and a rotor section compressively held in sliding contact, said fixed section having at least two pairs of inlet and outlet passages, each pair being adapted to be connected to a different fluid stream, a sample chamber of known volumetric capacity connected to inlet and outlet passages, all said passages being uniformly disposed about the rotational axis of said device, a plurality of passages in said rotor arranged to interconnect pairs of adjacent inlet and outlet passages, and means for rotatably positioning said rotor with respect to said fixed section of said device, whereby to select a known volume of sample from one of said fluid streams and introduce said sample into another of said streams.

4. A sampling device comprising a body assembly including a fixed section and a rotor section compressively held in sliding contact, said fixed section having at least two pairs of inlet and outlet passages, each pair being adapted to be connected to a different fluid stream, a sample chamber of known volumetric capacity connected to inlet and outlet passages, all said passages being uniformly disposed about the rotational axis of said device, a plurality of arcuate recesses in the contact face of said rotor, said arcuate recesses being arranged to interconnect pairs of adjacent inlet and outlet passages, and means for rotatably positioning said rotor with respect to said fixed section of the device, whereby to select a known volume of sample from one of said fluid streams and introduce said sample into another of said streams.

5. A sampling device comprising a body assembly including a fixed section and a rotor section compressively held in sliding contact, said fixed section having a plurality of inlet and outlet ports connecting with the sliding contact face of said body assembly and uniformly spaced about the rotational axis of said device, at least two pairs of internal radial passages connecting with pairs of said ports, a pair of internal passages parallel to said rotational axis and connecting with a pair of said ports, a removable sample chamber of known volumetric capacity connected to said last-named pair of ports, a plurality of arcuate recesses in the contact face of said rotor, said arcuate recesses being arranged to interconnect pairs of adjacent inlet and outlet ports, and means for rotatably positioning said rotor with respect to the fixed section of said device, whereby to select a known volume of sample from one of said fluid streams and introduce said sample into another of said streams.

6. A sampling device comprising a body assembly having a fixed section and a rotor section compressively held in sliding contact, said fixed section having at least two pairs of inlet and outlet passages connecting with its contact face, each pair of said passages being connectable to receive an external fluid stream, a plurality of U-shaped tubes having both ends attached to ports uniformly spaced about the rotational axis of said rotor, and means for rotatably positioning said rotor with respect to said fixed section whereby a sample may be selected from one of said fluid streams and introduced into another of said streams, the volume of sample being in accordance with the U-tube used to effect said switching.

7. A sampling assembly comprising a split-section fixed member and a movable member compressively held therebetween in sliding contact, a plurality of inlet passages in one section of said fixed member, a plurality of outlet passages arranged in the other section of said fixed member to align with said inlet passages, a plurality of sample chambers of different volumes in said movable member, and means for selectively positioning said movable member.

8. A sampling device comprising a fixed section of stainless steel having at least two pairs of inlet and outlet ports, each pair being adapted to be connected to a different fluid stream, a sample chamber of known volumetric capacity connected to inlet and outlet passages, all said passages being uniformly disposed about the rotational axis of said device, a rotor assembly, including a face of resilient material and a back-up plate, spring means positioned in compressive contact with said back-up plate maintaining said resilient face in slidable contact with said fixed section, a plurality of passages in said rotor arranged to interconnect pairs of adjacent inlet and outlet ports, and means for rotatably positioning said rotor with respect to said fixed section of said device, whereby to select a known volume of sample from one of said fluid streams and introduce said sample into another of said streams.

9. A sampling assembly comprising a rotor member having a plurality of sample chambers of different volumes disposed about its rotational axis, a split-section fixed member having resilient faces affixed to its inner surfaces in contact with said rotor member, a plurality of inlet passages in one section of said fixed member, a plurality of outlet passages arranged in the other section of said fixed member to align with said inlet passages, each aligned pair of said inlet and outlet passages being connectable to a different fluid stream, spring means positioned to exert compressive pressure between the split sections of said fixed member, and means for selectively positioning said rotor member, whereby to select a sample from one fluid stream and introduce it into another of said streams, the volume of sample being dependent upon the sample chamber selected.

References Cited in the file of this patent

UNITED STATES PATENTS

| Re. 24,055 | Daniels | Aug. 30, 1955 |
| 1,519,549 | Nellissen | Dec. 16, 1924 |
| 1,717,012 | Dixon | June 11, 1929 |
| 2,111,169 | Clark | Mar. 15, 1938 |
| 2,302,061 | Schirm | Nov. 17, 1942 |
| 2,696,219 | Barksdale | Dec. 7, 1954 |
| 2,713,268 | Langsenkamp | July 19, 1955 |

FOREIGN PATENTS

| 5,019 | Great Britain | Mar. 4, 1911 |